(12) United States Patent
Sauter et al.

(10) Patent No.: US 6,375,278 B1
(45) Date of Patent: Apr. 23, 2002

(54) HYDRAULIC PARKING BRAKE

(75) Inventors: Jeffrey F. Sauter, Lowville; Robert L. Neulieb, Theresa; Howard E. Huber, Jr., Black River; Lyle J. Jantzi, Adams, all of NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/739,672

(22) Filed: Dec. 20, 2000

(51) Int. Cl.⁷ .......................... B60R 25/08; F16D 31/02
(52) U.S. Cl. ............................ 303/89; 60/476
(58) Field of Search ................ 303/89, 3, 10, 303/11, 15, 20, 71; 60/420, 428, 429, 462, 464, 473, 476; 188/72.4, 156, 170

(56) References Cited

U.S. PATENT DOCUMENTS

| | | |
|---|---|---|
| 3,891,277 A | 6/1975 | Cope |
| 3,944,286 A | 3/1976 | Engle et al. |
| 4,201,277 A | 5/1980 | Meier et al. |
| 4,368,927 A | 1/1983 | Billingsley et al. |
| 4,368,928 A | 1/1983 | Billingsley et al. |
| 4,653,812 A | 3/1987 | Engle |
| 4,733,602 A | 3/1988 | Smith et al. |
| 4,746,171 A | 5/1988 | Engle |
| 4,874,065 A | 10/1989 | Engle |
| 4,978,178 A | 12/1990 | Engle |
| 5,181,830 A | * 1/1993 | Favre ................. 60/405 |
| 5,203,616 A | 4/1993 | Johnson |
| 5,558,410 A | 9/1996 | Kanjo et al. |
| 5,564,795 A | 10/1996 | Engle |
| 5,701,974 A | 12/1997 | Kanjo et al. |
| 5,701,975 A | 12/1997 | Hawryszkow |
| 5,738,416 A | 4/1998 | Kanjo et al. |
| 5,794,739 A | 8/1998 | Ring et al. |

OTHER PUBLICATIONS

"Evaluation of a Hydraulic Freight–Car Parking Brake", Technology Digest, Timely Technology Transfer 98–022, Aug. 1998.

* cited by examiner

Primary Examiner—Paul N. Dickson
Assistant Examiner—C. T. Bartz
(74) Attorney, Agent, or Firm—Barnes & Thornburg

(57) ABSTRACT

A parking brake for a rail car vehicle including an electric motor driving a hydraulic pump fluidly connected to and controlling a bidirectional hydraulic actuator coupleable to the rail car's wheel brakes. An electric controller is connected to the pump and controls activation/deactivation of the pump with the controller including various switches. Also included is a coupler for coupling the actuator to one of a brake beam or an actuator of the parking brake.

21 Claims, 4 Drawing Sheets

HYDRAULIC PARKING BRAKE

BACKGROUND AND SUMMARY OF THE INVENTION

The present invention relates generally to manually controlled parking brakes for rail vehicles and more specifically to a manual parking brake for locomotives and car mounted cylinders for rail cars.

Current locomotive parking brake systems require high manual input force to apply an unknown brake shoe force through a complex system of levers, chains and brackets. The high manual force could result in injuries to the operator as well as applying an unknown parking brake force on the wheel.

Typically, the hand brake or parking brake consists of a device for manually applying a brake shoe to the wheel of a railroad car by turning a hand wheel or pumping a handle connected by gears and/or linkages to the brake shoe. This linkage is the same linkage which is used to apply or release the brakes throughout the train. Typical examples are shown in U.S. Pat. Nos. 4,746,171 and 5,701,974. The manual apply and release forces are required because the car or locomotive does not include a source of air pressure, which is normally used to control the brakes, in the park or isolated position. An example of the hydraulic brakes with a reservoir pump and pump actuated means is shown specifically in U.S. Pat. No. 5,701,975.

Although the brake systems of various types have been applied to rail cars, there is a need for a locomotive manual parking brake which is capable of applying a substantially greater known braking force. If such a brake is available, the brake on less than all of the wheels of the locomotive can be applied in park to maintain the locomotive in a brake condition.

The parking brake of the present invention includes an electric motor controlling a hydraulic pump fluidly connected to and controlling a bidirectional hydraulic actuator for the wheel brakes. An electrical controller is connected to the pump and controls activation/deactivation and direction of activation of the pump. The controller may include a bidirectional electric motor coupled to a bidirectional pump and a selection switch which selectively connects the electrical motor to an electrical source in opposite polarities. The selection switch also selectively disconnects the electric motor from the electrical source. Alternatively, a unidirectional electric motor and unidirectional pump are connected to the actuator by a selection valve to the actuator.

The controller can also include a pressure switch response to fluid pressure between the pump and the hydraulic motor and the controller deactivates the pump for excessive pressure. A pressure relief valve for the fluid pressure between the pump and the hydraulic motor may also be provided. Preferably, the pump is connected to the hydraulic motor by a pair of passages and the controller includes a pair of pressure switches and relief valves, each responsive to pressure in a respective passage.

The controller may also include a limit switch responsive to the position of the actuator and the controller deactivates the motor and the pump when the actuator element reaches a predetermined position. The brake system includes a hydraulic reservoir. The controller includes a level switch responsive to the level of fluid in the reservoir and the controller deactivates the motor and the pump for a low level of hydraulic fluid in the reservoir.

The controller may activate the pump in one direction of activation if both the pressure and the limit switches are closed. The pump is also activated in the other direction of activation if the pressure switch is closed, even if the limit switch is open. The actuator element may include a coupler for coupling to either the brake bream of the wheel brakes or the actuator or brake cylinder system of the wheel brakes.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
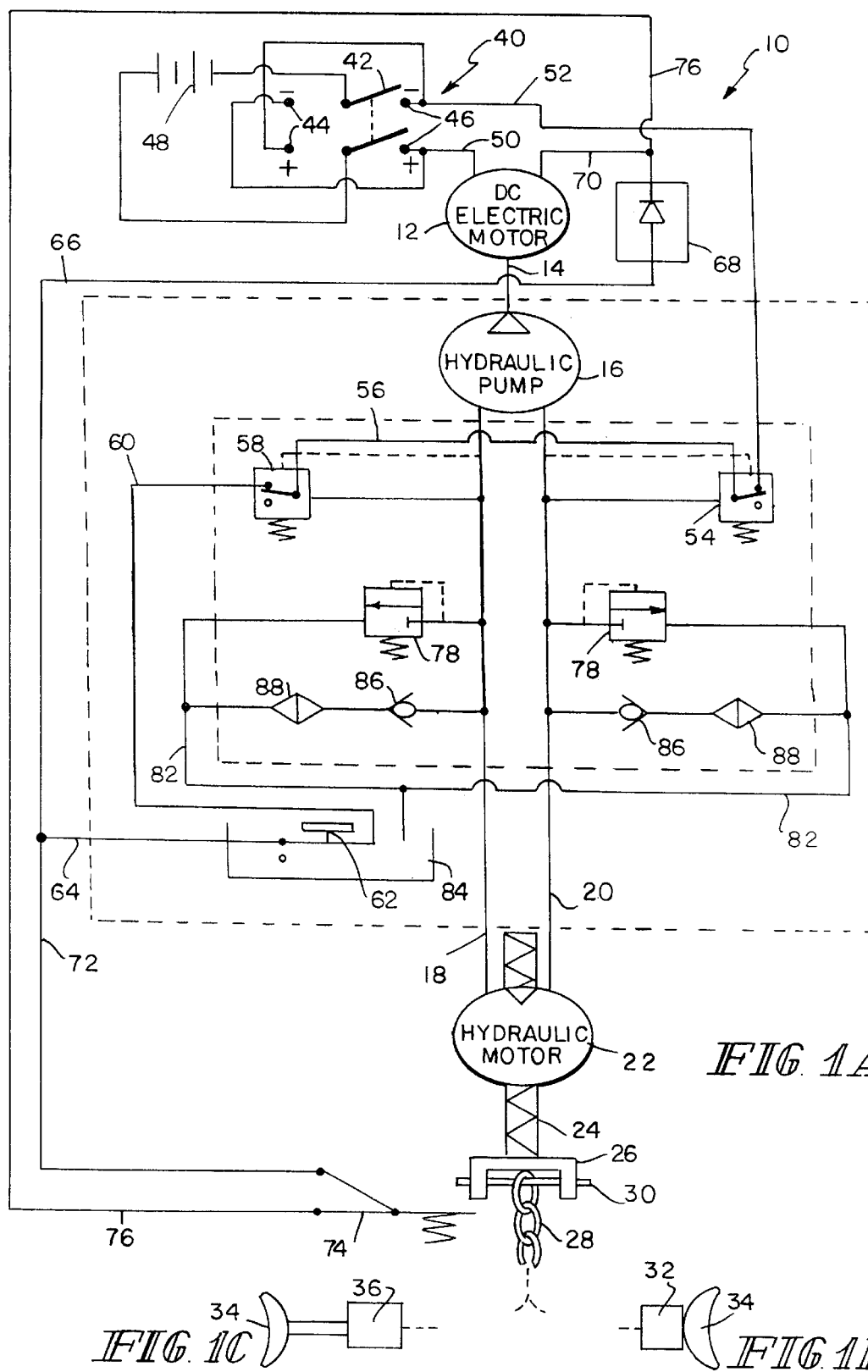
FIG. 1A is a schematic of a hydraulic parking according to the principles of the present invention.
FIG. 1B is a connection of the actuator of FIG. 1A to a brake beam of a truck mounted brake.
FIG. 1C shows the connection of the actuator of FIG. 1A to the brake cylinder of a brake system.

A hydraulic parking brake 10 is illustrated in FIG. 1A. The brake system include a DC electric motor 12 connected by shaft 14 to a hydraulic pump 16. The electric motor 12 and hydraulic pump 16 may be in a common housing or integrated pack. The hydraulic pump 16 is connected by lines or passages 18 and 20 to the hydraulic actuator 22. The electric motor 12, hydraulic pump 16 and the hydraulic actuator 22 are all bidirectional in FIGS. 1A and 2. A unidirectional electric motor 12 (not shown), selection valve 100 and hydraulic pump 16 are shown in FIG. 3. The hydraulic motor 22 includes a screw 24 with a clevis 26 at the end thereof. A chain 28 is connected to the clevis 26 by pin 30, as shown in FIG. 1A.

The chain 28 controls, for example, a brake beam 32 which actuates brake shoe 34 as illustrated in FIG. 1B. A typical example is found in U.S. Pat. No. 4,495,921. Alternatively, the chain 28 may be connected to a brake cylinder 36 which controls brake shoe 34 as illustrated in FIG. 1C. The chain 28 may either be connected to the cylinder 36 directly or to the linkage which drives the brake shoe 34 that is common to the brake cylinder 36. The actuation device for the brake beam 32 of FIG. 1B is not shown and is well known.

A control system to determine the activation/deactivation as well as the direction of operation of the hydraulic motor 22, pump 16 and actuator 22 includes a selection switch 40. Switch 40 includes a toggle 42 shown in its open position. Toggle 42 can be connected to contacts 44 or contacts 46 which determine the connection of the polarity of battery 48 to the electric motor 12. When the toggle 42 engages to contacts 44, lead 50 of DC motor 12 is connected to the negative terminal of battery 48 and lead 52, through the to be described circuit, connects lead 70 of the DC motor to the positive terminal of the battery 48. When toggle 42 engages contacts 46, lead 50 of the motor is connected to the positive terminal of battery 48 and lead 70 via at least line 52 is connected to the negative terminal of the battery 48.

Lead 52 of switch 40 is connected to lead 70 of the motor through various switches. Lead 52 is connected in series with a normally closed pressure switch 54 which is responsive to the pressure in passage 20 between the hydraulic pump 16 and the hydraulic actuator 22 and, via line 56, is in series with normally closed pressure switch 58 which is responsive to the pressure in passage 18 between the hydraulic pump 16 and the hydraulic actuator 22. The pressure switch 58 is connected via line 60 with level switch 62 which is connected via line 64 and 66 to terminal 70 of the electric motor 12 via diode 68. The level switch 62 may be a float switch sensing the level of hydraulic fluid in reservoir 84.

A normally closed limit switch 74 is connected in series with pressure sensitive switches 54, 58 and level switch 62 via line 72. Line 76 connects the normally closed limit switch 74 to terminal 70 of the electrical motor 12. The limit switch 74 is responsive to the position of the actuator element or screw 24. The purpose of limit switch 74 is to deactivate the hydraulic actuator 22 to prevent runout of the screw 24 from hydraulic actuator 22.

Relief valves 78 interconnect the passages 18 or 20 via return line 82, a check valve 86 and filter 88. When the pressure in passage 18 or 20 exceeds the value of the relief valve 78, the passages 18, 20 are connected to the low pressure side. If the pressure in return line 82 becomes greater than the pressure for that passage 18 or 20, the respective check valve 86 will open which will provide a flow back to the low pressure passage 18 or 20. This maintains a minimum amount of pressure in passage 18 or 20 even after the relief valve 78 has opened. The check valves 86 prevent the high pressure fluid from blowing into the low pressure side. This allows the pump 16 to have a connection to the inlet low pressure fluid in either direction of rotation of the pump.

If this pressure is sufficiently high, it opens the respective pressure switch 54 and 58 and deactivates the electric motor 12 and the pump 16.

The operation of the hydraulic parking brake system 10 may begin with moving the toggle 42 of switch 40 to contacts 44. This places the negative terminal on lead 50 and the positive terminal on lead 52 of the switch 40. Since the motor 12 and consequently the pump 16 have been deactivated, there is minimum pressure in passages 18 and 20 and the relief valves 78 are closed and the pressure switches 54 and 58 are closed. Assuming appropriate levels of fluid in reservoir 84, the float switch 62 is closed. If the actuator element 24 is in the position shown, the limit switch 74 is closed.

This polarity on motor 12 will drive the hydraulic pump 16 to operate the hydraulic actuator 22 to retract the actuator element 24. This operation of the chain 28 would apply the brakes. Once the force on the actuator 24 resulting from the brake shoes engaging the wheel and exerting a given amount of brake force, the pressure in passage 18, for example, will rise causing pressure switch 58 to open. This disconnects the series connection between contact 44, line 52 and terminal 70 of the motor.

The interruption of the current to the electric motor 12 deactivates the pump 16 and the hydraulic actuator 22. The actuating element 24 or screw is locked in its retracted position. Thus, the electric motor 12, the hydraulic pump 16 and the hydraulic actuator 22 are deactivated even though the switch 42 may be on contacts 44 attempting to drive the system to apply additional braking force.

Once a DC motor 12 has stopped, the locking pressure in passage 18 or 20 is below that of the pressure relief switch 78 disconnecting the pressure switches 54 and 56 from the passages 18 and 20. Thus, pressure switches 54 and 58 assume their normally closed position allowing reactivation of the DC motor. If there is an attempt to further apply force by connecting toggle 42 to contacts 44, any additional pressure would very quickly build up in passages 18 or 20 and activate the appropriate pressure switch 58 to again turn off the system. The resetting of switches 54 and 58 allows the DC motor to be operated in the opposite direction to extend the element 24 and thereby release the brakes.

To release the parking brakes, toggle 42 and switch 40 is then connected to contacts 46. This applies the positive terminal of the battery 48 to terminal 50 of the motor 12 and the negative terminal of the battery 48 to the terminal 70 of the motor. The pressure switches 54 and 58 are in their normally closed position. Also, it assumes that the float switch 62 is in its normally closed position. Since the activated element 24 has been retracted, the limit switch 74 is closed.

Once the actuator element 24 has been extended to the limit set by the limit switch 74, limit switch 74 will open and deactivate the motor 12 and pump 16. The relief side pressure switch 54 is a safety device which will deactivate the system if the actuator 22 becomes jammed.

If the extension of element 24 continues beyond a position determined by limit switch 74 and the motor is not cut off by the opening of pressure switch 54, the limit switch 74 will open. The opening of limit switch 74 will deactivate electric motor 12, pump 16 and hydraulic actuator 22.

The series connected normally closed pressure switches 54 and 58 and the normally closed float switch 62 are connected via lead 66 and diode 68 to terminal 70 of the DC motor 12. Line 64 is also connected through line 72, limit switch 74 and line 76 to terminal 70 directly.

The connection of the series of connected switches 54, 58 and 62 to the motor 70 through diode 68 can only occur when lead 52 of switch 40 is connected to the positive terminal of the battery 48. This forward biases the diode to turn on. This exists when toggle 42 engages contacts 44 to retract the actuation element 24. This allows actuation of the DC motor 12 even if the limit switch 74 is open, signifying that the actuation element 24 has been extended too far.

If terminal 52 of switch 40 is connected to the negative terminal of battery 48 by toggle 42 connected to contacts 46, the polarity across diode 68 from the normally closed switches 54, 58 and 62 bias diode 68 off and places the switches in series with the limit switch 74. Thus, if the limit switch 74 is opened, the DC motor is not activated and therefore the actuating element 24 will not be further extended.

In summary, the DC motor 12, pump 16 and hydraulic actuator 22 can be activated to extend the actuating element 24 if all of the switches 54, 58, 62 and 74 are closed and can be activated to retract the actuating element 24 if all of the switches 54, 58 and 62 are closed, even if the limit switch 74 is open.

Figure 2:
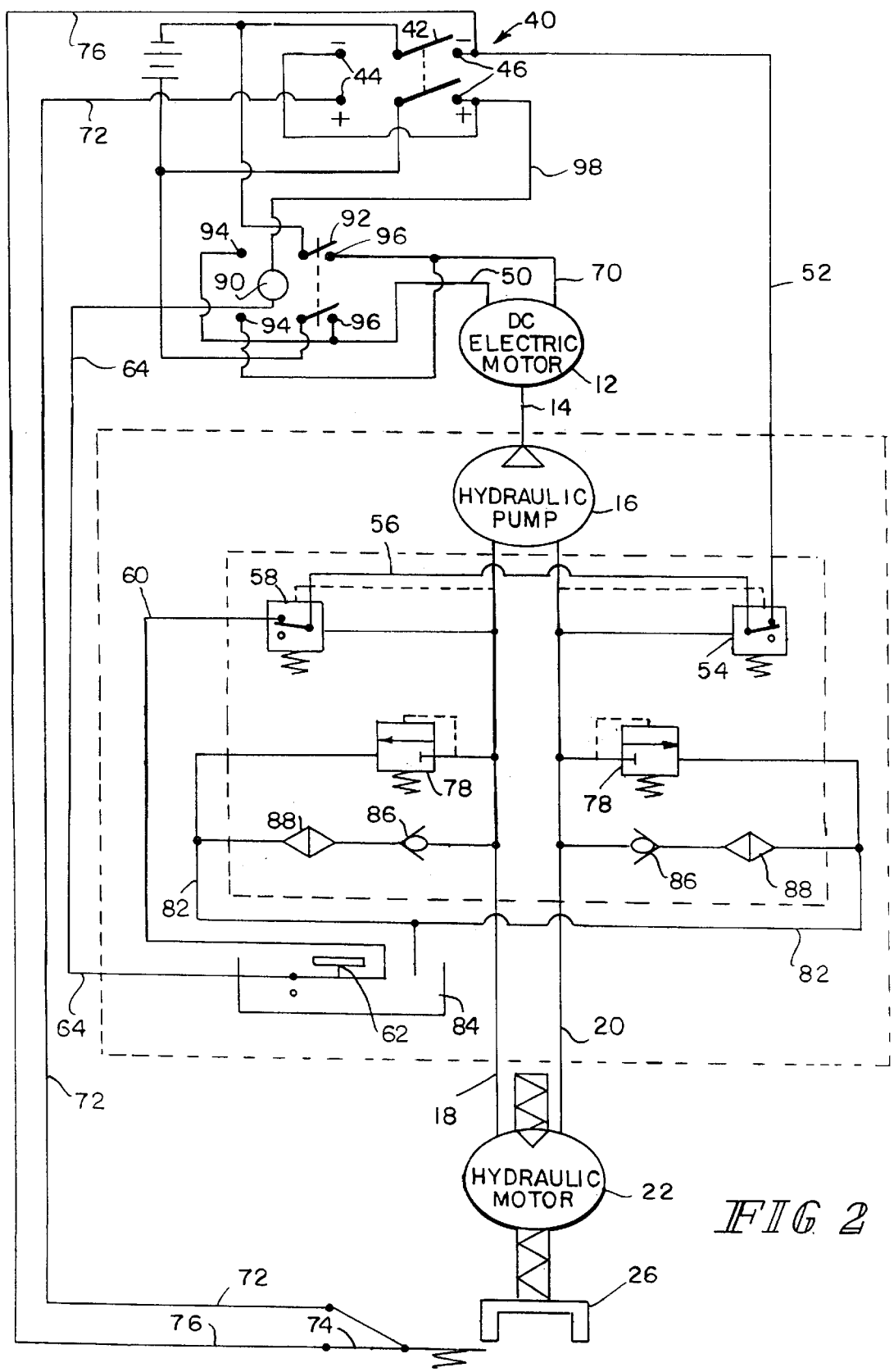
FIG. 2 is a schematic of a modification of the hydraulic parking brake of FIG. 1.
Figure 3:
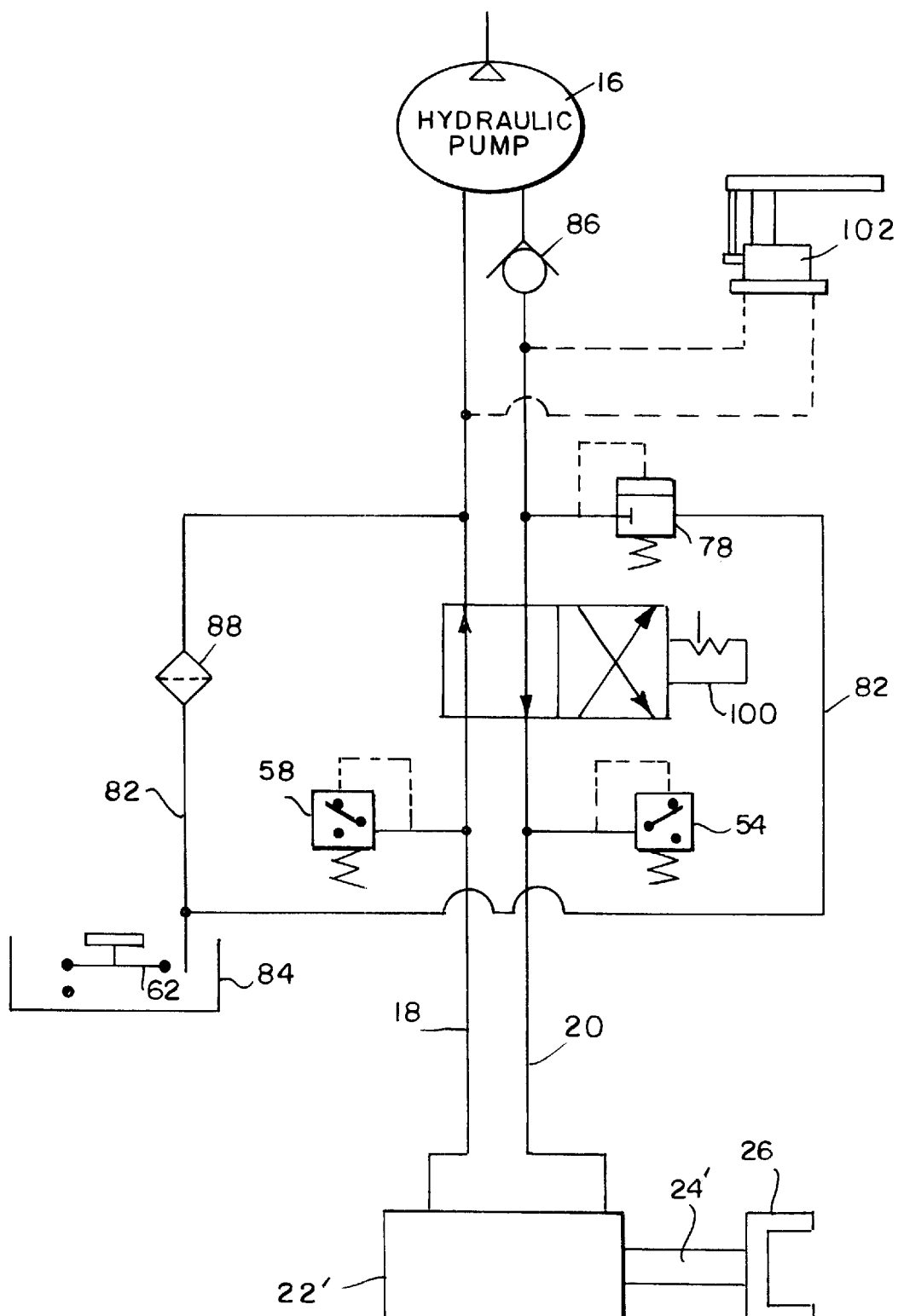
FIG. 3 is a hydraulic schematic of another embodiment of a hydraulic parking brake according to the principles of the present application.

A modification of the embodiment of FIG. 1 including a bidirectional motor 12 and a bidirectional pump 16 is illustrated in FIG. 2. The difference is the electrical control circuit and not the hydraulic circuit. Leads 50 and 70 of the electric motor 12 are connected to the battery 48 by a relay 90 which controls toggle 92 between pairs of contacts 94, 96. The relay 90 is connected to the selection switch 40 by line 98 and connected to the series connected switches 62, 58 and 54 via line 64. It should be noted that diode 68 has been deleted and that line 72 of the limit switch is connected to one of the contacts 44 of switch 40. The other line 76 of the limit switch 74 is connected to line 52 to place it in series with the other switches 62, 58 and 54 in the release position of the selection switch 40.

The position of toggle 42 and selection switch 40 controls the relay 90 to have its toggle 92 to either contacts 96 that drive the electric motor 12 in one direction or contacts 94 to drive it in the opposite direction. When the switch 40 is in the applied position with toggle 42 contacting contacts 46, the switches 62, 58 and 54 are in series with the relay 90. When the toggle 42 or switch 40 is in the release position, the limit switch 74 is also placed in series with the relay 90 and the switches 62, 58 and 54. Thus, as previously stated, the pressure switches and the float switch must be closed for the apply selection to activate the DC motor and the pump irrespective of the condition of the limit switch 74. In the release position, the continued activation of the DC motor 12 and the pump 16 requires that the pressure switches, the float switch and the limit switch remain closed.

An embodiment illustrated in FIG. 3 uses a unidirectional motor 12 and unidirectional pump 16. The selection of control of apply and release is produced by a selection valve 100 connected between the pump 16 and the actuator 22'. Selector 100 is a two position four-way valve. The position shown applies pressure on line 20 and relieve pressure on line 18. In the second position (not shown), pressure is applied to line 18 and relieved on line 20. The relief valve 78 and the check valve 86 are only provided on the applied line 20. Both the apply line 20 and the released line 18 include pressure switches 54 and 58. Also illustrated is a hand pump 102 which can supplement or be used instead of the electric motor 12 (not shown) and hydraulic pump 16 if there is a failure of the electrical system or the hydraulic pump 16.

The actuator 22' may be a mechanical actuator having an actuator element 24' connected to clevis 26. Also, it may be a locking actuator as described in U.S. patent application Ser. No. 09/661,565 filed Sep. 14, 2000. Such an actuator is driven into an applied position and stays locked in that applied position until pressure is provided on the release side to release the locking mechanism. A regular actuator 22' would require a hydraulic or fluid lock. In either case, the actuator element 24 would not ever play out as it would in the screw motor 22 of FIGS. 1 and 2. Therefore, it will be noted that no limit switch 74 is required for actuator 22'.

Figure 4:
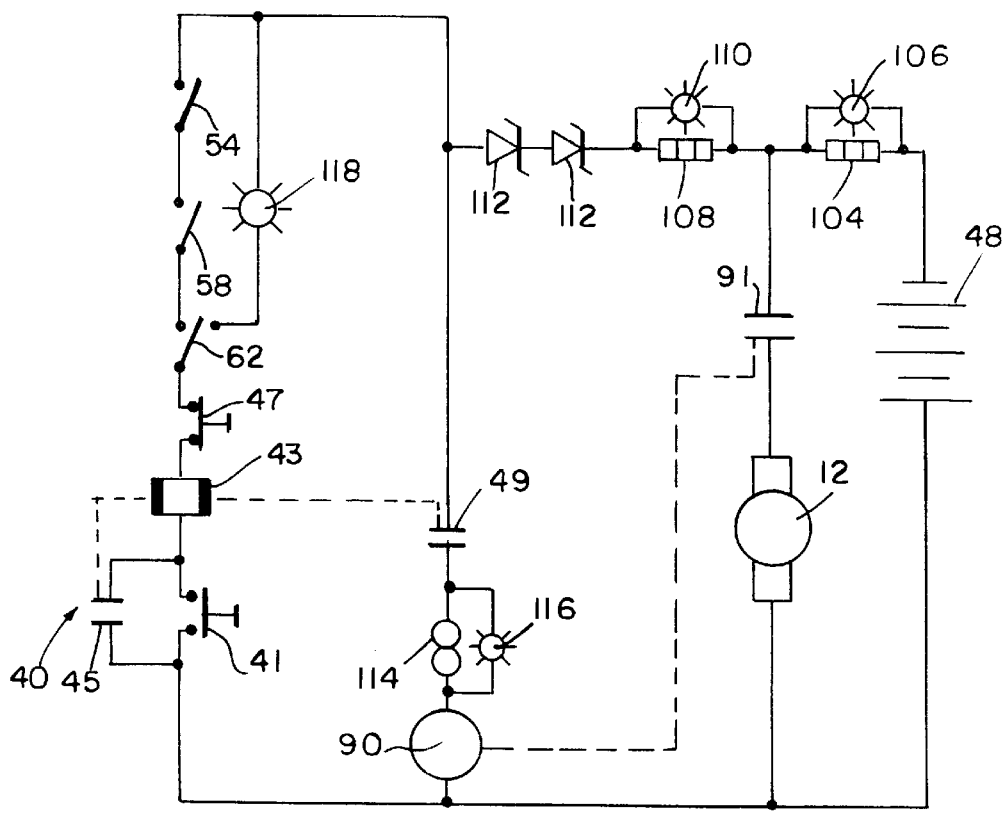
FIG. 4 is an electrical schematic for the embodiment of FIG. 3.

The modified electrical schematic for the embodiment of FIG. 3 is illustrated in FIG. 4. The battery 48 is connected to the, motor 12 via fuse 104 prevents circuit overload. An indicator 106 is parallel to the resistor 104. Contact 91 is in series with the motor 12 and controlled by the motor relay 90. A fuse 108 with parallel indicator 110 and a pair of zener diodes 112 further drop the voltage provided to the motor relay 90 and the remainder of the switch in the control circuits. A thermal switch 114 with parallel indicator 116 is connected in series with the motor relay 90.

A modified selection switch 40 is shown as including normally opening start switch 41 in series with a relay 43 which controls latching contacts 45 in parallel to the start switch 41. A normally closed stop switch 47 is also in series with the relay 43 and the start switch 41. The float switch 62 and the two pressure switches 58 and 54 are in series with the selection switch 40.

Under normal conditions, switches 62, 58 and 54 are closed as is stop switch 47. Upon pressing start switch 41 closed, the relay 43 closes contacts 49 in series with the motor contact relay 90. This activates relay 90 which closes contacts 91 turning on the motor 12. Relay 43 also closes contacts 45 providing a path parallel to and latching start switch 41. Thus, release of start switch 41 will not break the circuit for the relay 43. The only thing that will reset the relay 43 and turn off the motor 12 and the pump 16 will be the stop switch 47 opening or one of the float switch 62 or pressure switches 58 and 54 opening.

It should be noted that if float switch 62 assumes its second position, it is connected to illuminate indicator 118 indicating that fluid is low while the pump is running. If the pump is not running, then there is no direct electrical connection. The indicator 116 in parallel to the thermal 114 will only light when the thermal contacts 114 open. The fuse 104 fuse 108 and diodes 112 would further drop the voltage available to the remainder of the circuit to about 24 volts.

Figure 5:
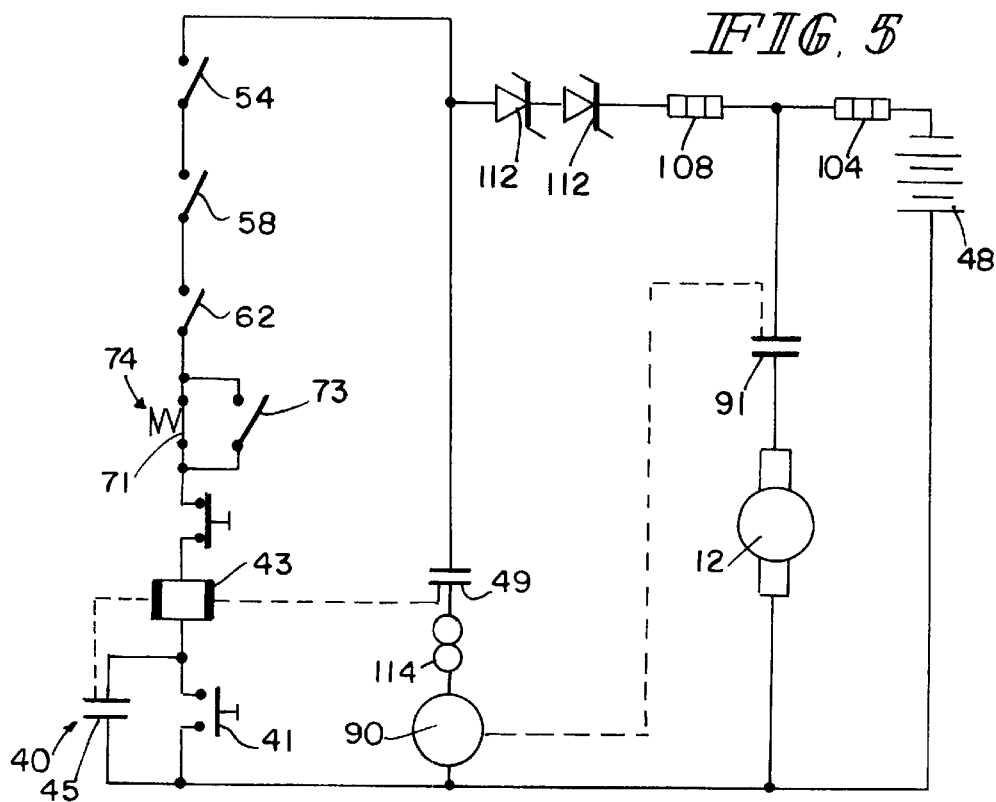
FIG. 5 is an electrical schematic of a modification of the embodiment of FIG. 3.

If the actuator is the screw actuator of FIGS. 1 and 2, the electrical schematic of FIG. 4 will be modified as illustrated in FIG. 5. The limit switch 74 is placed in series with the pressure switches 54 and 58 and the float switch 62. All of the indicators 106, 110, 160, and 118 are not shown in FIG. 5, but may or may not be provided. The remainder of the circuit is the same as that in FIG. 4 and operates in the same way. The limit switch 74 includes a normally closed switch portion 71 and a switch portion 73 responsive to the apply/release selector switch. Switch portion 71 is responsive to the position of the actuator and it opens if the screw element 24 plays out in the release position. When applied, switch 73 is closed such that the opening and closing of position element 71 has no effect on the operation or inactivation of the motor and pump.

The DC motor 12, the hydraulic pump 16 and hydraulic actuator 22 are selected so as to produce high torque with low speeds. The goal to be achieved is 35,000 pounds of braking force. This is to hold a 350,000–450,000 pound locomotive. If this braking force can be produced, less than all of the wheels of the locomotive need to be braked. For example, only four of the twelve wheels need to be braked. This reduces the cost of interconnecting the parking brake actuator 24 to all of the brake actuating systems. The battery 48 may be the 72 volt DC battery available in the locomotive or may be another battery or voltage source.

For example, the apply side relief valve 78 may be set in the range of 2,500 to 2,800 psi and may be, for example, 2,750 psi. The release side relief valve 78 may be set in the range of 1,200 to 1,550 psi and may be, for example, 1,500 psi. Similarly, the apply limit switch 54 may be set in the range of 2,250 to 2,550 psi and may be, for example, 2,500 psi. The release limit switch 54 may be set in the range of 1,000 to 1,500 psi and may be, for example, 1,250 psi. The DC motor 12 may be for example 1 horsepower, the pump 16 having a capacity of, for example 0.08 inches$^3$ per revolution and the hydraulic actuator 27 having a capacity of, for example, 2.5 to 3.0 inches$^3$ per revolution.

The brake system 10 has been described with respect to locomotive brakes. It may also be applied on other rail cars providing its own battery source 48.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A parking brake for a rail car vehicle which includes wheel brakes applied and released under the control of an actuator, the parking brake comprising:

a bidirectional hydraulic pump;

a bidirectional hydraulic actuator connected to and controlled by the pump and coupleable to the wheel brakes;

an electric controller connected to the pump and controlling activation-deactivation and direction of activation of the pump; and a coupler for coupling the actuator to one of a brake beam or an actuator of the parking brake of a rail car vehicle.

2. A parking brake according to claim 1, wherein the controller includes a bidirectional electric motor coupled to the pump and a selection switch selectively connecting the electrical motor to an electrical source in opposed polarity.

3. A parking brake according to claim 2, wherein the selection switch also selectively disconnects the electric motor from the electrical source.

4. A parking brake according to claim 2, wherein the controller includes a pressure switch responsive to fluid pressure between the pump and the hydraulic actuator and the controller deactivates the pump for excessive pressure.

5. A parking brake according to claim 2, wherein the controller includes a limit switch responsive to the position of the actuator and the controller deactivates the pump when the actuator reaches a predetermined position.

6. A parking brake according to claim 1, including a hydraulic reservoir and wherein the controller includes a level switch responsive to the level of hydraulic fluid in the reservoir and the controller deactivates the pump for a low level of hydraulic fluid.

7. A parking brake for a rail car vehicle which includes wheel brakes applied and released under the control of an actuator, the parking brake comprising:

a bidirectional hydraulic pump;

a bidirectional hydraulic actuator connected to and controlled by the pump and coupleable to the wheel brakes;

an electric controller connected to the pump and controlling activation-deactivation and direction of activation of the pump; and wherein the controller includes a pressure switch responsive to fluid pressure between the pump and the actuator and the controller deactivates the pump for excessive pressure.

8. A parking brake according to claim 7, including a relief valve responsive to the pressure between the pump and the actuator.

9. A parking brake according to claim 7, wherein the pump is connected to the hydraulic actuator by two passages and the controller includes pair of pressure switches and relief valves each responsive to the pressure in a respective passage.

10. A parking brake according to claim 7, including a hydraulic reservoir and wherein the controller includes a level switch responsive to the level of hydraulic fluid in the reservoir and the controller deactivates the pump for a low level of hydraulic fluid.

11. A parking brake for a rail car vehicle which includes wheel brakes applied and released under the control of an actuator, the parking brake comprising:

a bidirectional hydraulic pump;

a bidirectional hydraulic actuator connected to and controlled by the pump and coupleable to the wheel brakes;

an electric controller connected to the pump and controlling activation-deactivation and direction of activation of the pump;

wherein the controller includes a normally closed pressure switch responsive to the pressure between the pump and the actuator and a normally closed limit switch responsive to the position of the actuator; and wherein the pump is activated in one direction of activation if both the pressure and limit switches are closed and is activated in the other direction of activation if the pressure switch is closed even if the limit switch is open.

12. A parking brake for a rail car vehicle which includes wheel brakes applied and released under the control of an actuator, the parking brake comprising:

an electric motor;

a hydraulic pump coupled to and controlled by the electric motor;

a hydraulic actuator coupled to and controlled by the pump and coupleable to the wheel brakes; and an electric controller coupled to the electrical motor and controlling the positioning of the actuator; and further including a selection valve selectively connecting the pump and the actuator in opposed flow directions for applying and releasing the brakes.

13. A parking brake for a rail car vehicle which includes wheel brakes applied and released under the control of an actuator, the parking brake comprising:

an electric motor;

a hydraulic pump coupled to and controlled by the electric motor;

a hydraulic actuator coupled to and controlled by the pump and coupleable to the wheel brakes;

an electric controller coupled to the electrical motor and controlling the positioning of the actuator; and wherein the controller includes a latching relay having contacts in series with a motor relay and the motor relay has contacts in series with the electrical motor.

14. A parking brake for a rail car vehicle which includes wheel brakes applied and released under the control of an actuator, the parking brake comprising:

an electric motor;

a hydraulic pump coupled to and controlled by the electric motor;

a hydraulic actuator coupled to and controlled by the pump and coupleable to the wheel brakes;

an electric controller coupled to the electrical motor and controlling the positioning of the actuator;

wherein the controller includes a normally closed pressure switch responsive to the pressure between the pump and the actuator and a normally closed limit switch responsive to the position of the actuator; and wherein the pump is activated in one direction of activation if both the pressure and limit switches are closed and is activated in the other direction of activation if the pressure switch is closed even if the limit switch is open.

15. A parking brake according to claim 14, wherein the controller includes a selection switch selectively connecting the electrical motor to an electrical source in opposed polarity for applying and releasing the brakes.

16. A parking brake according to claim 15, wherein the selection switch includes a relay with contacts connecting the electrical motor to the electrical source.

17. A parking brake according to claim 14, wherein the controller includes a pressure switch responsive to fluid pressure between the pump and the hydraulic actuator to deactivate the motor and the pump for excessive pressure.

18. A parking brake according to claim 14, wherein the controller includes a limit responsive to the position of the actuator to deactivate the motor and the pump when the actuator reaches a predetermined position.

19. A parking brake according to claim 14, including a hydraulic reservoir and wherein the controller includes a level switch responsive to the level of hydraulic fluid in the reservoir and the controller deactivates the motor and the pump for a low level of hydraulic fluid.

20. A parking brake according to claim 14, wherein the controller includes a plurality of normally closed switches responsive to conditions of the pump and the actuator; and the motor and pump are activated if all of the switches are closed.

21. A parking brake for a rail car vehicle which includes wheel brakes applied and released under the control of an actuator, the parking brake comprising:

an electric motor;

a hydraulic pump coupled to and controlled by the electric motor;

a hydraulic actuator coupled to and controlled by the pump and coupleable to the wheel brakes;

an electric controller coupled to the electrical motor and controlling the positioning of the actuator; and wherein the controller includes a pressure switch responsive to fluid pressure between the pump and the hydraulic actuator to deactivate the motor and the pump for excessive pressure.

\* \* \* \* \*